(12) United States Patent
Schriever et al.

(10) Patent No.: US 11,830,455 B2
(45) Date of Patent: Nov. 28, 2023

(54) METHOD, COMPUTER PROGRAM AND APPARATUS FOR CONTROLLING OPERATION OF TWO OR MORE CONFIGURABLE SYSTEMS OF A MOTOR VEHICLE

(71) Applicant: Volkswagen Aktiengesellschaft, Wolfsburg (DE)

(72) Inventors: David Schriever, Wolfsburg (DE); Hyunmin Lee, Braunschweig (DE); Eduardo Luiz Vieira, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/868,511

(22) Filed: Jul. 19, 2022

(65) Prior Publication Data
US 2023/0072526 A1     Mar. 9, 2023

(51) Int. Cl.
| | | |
|---|---|---|
| G09G 5/00 | (2006.01) |
| G09G 3/00 | (2006.01) |
| G06F 3/14 | (2006.01) |
| G06F 3/16 | (2006.01) |
| B60Q 3/74 | (2017.01) |
| G06F 3/0484 | (2022.01) |

(52) U.S. Cl.
CPC ............ *G09G 5/005* (2013.01); *G06F 3/1423* (2013.01); *G06F 3/16* (2013.01); *G09G 3/035* (2020.08); *B60Q 3/74* (2017.02); *G06F 3/0484* (2013.01); *G09G 2354/00* (2013.01); *G09G 2380/10* (2013.01)

(58) Field of Classification Search
CPC ......... G06F 3/16; G06F 3/1423; G06F 3/0484
See application file for complete search history.

(56) References Cited

U.S. PATENT DOCUMENTS

| | | | | |
|---|---|---|---|---|
| 9,736,679 B2 | 8/2017 | Fliege | | |
| 2020/0380896 A1* | 12/2020 | Alex | ...................... | G09F 21/042 |
| 2021/0192867 A1* | 6/2021 | Fang | .................... | G07C 5/0816 |

FOREIGN PATENT DOCUMENTS

| | | | | |
|---|---|---|---|---|
| DE | 10226406 C1 | 12/2003 | ................ | B60J 7/00 |
| EP | 3694195 A1 | 8/2020 | ............. | B60K 35/00 |
| WO | 2014/044695 A1 | 3/2014 | ................ | G06F 9/44 |
| WO | 2017/137936 A1 | 8/2017 | ............... | G06F 3/00 |

OTHER PUBLICATIONS

Extended European Search Report, Application No. 21194749.4, 8 pages, dated Feb. 4, 2022.

* cited by examiner

*Primary Examiner* — Gerald Johnson
(74) *Attorney, Agent, or Firm* — Slayden Grubert Beard PLLC

(57) ABSTRACT

The present disclosure is related to a method, a computer program, and an apparatus for controlling operation of two or more configurable systems of a motor vehicle. The disclosure is further related to a mobile user device and a motor, which make use of such a method or apparatus. In a first step, a user input specifying an operation scenario is received via a user interface of a mobile user device. Operation parameters associated with the specified operation scenario are then retrieved for the two or more configurable systems and the two or more configurable systems are operated in accordance with the operation parameters.

20 Claims, 4 Drawing Sheets

METHOD, COMPUTER PROGRAM AND APPARATUS FOR CONTROLLING OPERATION OF TWO OR MORE CONFIGURABLE SYSTEMS OF A MOTOR VEHICLE

CROSS-REFERENCE TO RELATED APPLICATIONS

This application claims priority to European Patent Application No. EP 21194749.4, filed on Sep. 3, 2021 with the European Patent Office. The contents of the aforesaid Patent Application are incorporated herein for all purposes.

TECHNICAL FIELD

The present invention is related to a method, a computer program, and an apparatus for controlling operation of two or more configurable systems of a motor vehicle. The invention is further related to a mobile user device and a motor vehicle, which make use of such a method or apparatus.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Motor vehicles are typically provided with an entertainment system, e.g., for playback of sound or video. For example, a device for displaying visual information in a vehicle may be provided, which has an extendable display unit arranged on the inside of the vehicle roof, which is adjustable between a retracted rest position on the vehicle roof and an extended use position, in which it forms a rearward-facing display surface extending substantially vertically downwards from the vehicle roof. Projection units may be provided to project image information onto the display surface.

Such entertainment systems offer an ever-increasing number of features, e.g. high-quality video and audio playback, access to streaming services, etc. Furthermore, an entertainment system may offer the possibility to play video games or access internet services.

In addition to the increased capabilities of user entertainment, modern motor vehicles often offer the possibility to adapt the interior of the motor vehicle, for example the ambient light, to the mood or preferences of the user. While these features aim at providing a pleasant user experience, the increasing number of configurable systems may at the same time require the user to adapt multiple systems using a built-in user interface of the motor vehicle. This may sometimes be cumbersome for the user.

SUMMARY

A need exists to provide improved solutions for controlling operation of two or more configurable systems of a motor vehicle.

The need is addressed by a method, by a computer program which implements such a method, and by an apparatus as defined in the independent claims. The need is further addressed by a mobile user device and a motor vehicle as claimed. Embodiments of the invention are described in the dependent claims, the following description, and the drawings.

DESCRIPTION

Figure 1:
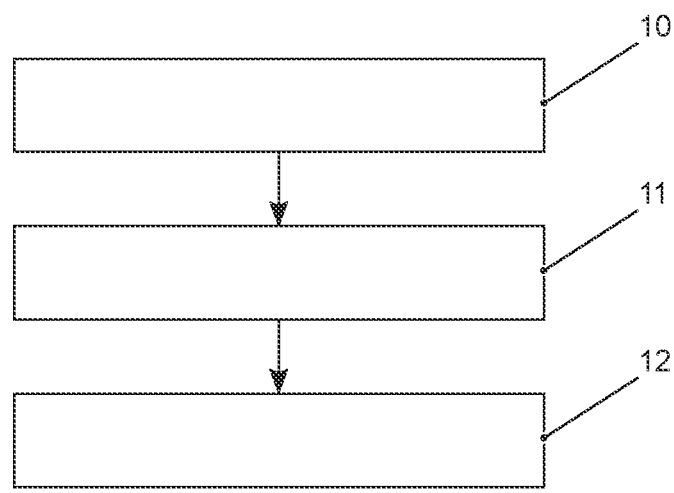
FIG. 1 schematically illustrates a method for controlling operation of two or more configurable systems of a motor vehicle according to an embodiment.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first example aspect, a method for controlling operation of two or more configurable systems of a motor vehicle comprises:
  receiving, via a user interface of a mobile user device, a user input specifying an operation scenario;
  retrieving operation parameters associated with the specified operation scenario for the two or more configurable systems; and
  operating the two or more configurable systems in accordance with the operation parameters.

Accordingly, an example computer program comprises instructions, which, when executed by a computer, cause the computer to perform the following steps for controlling operation of two or more configurable systems of a motor vehicle:
  receiving, via a user interface of a mobile user device, a user input specifying an operation scenario;
  retrieving operation parameters associated with the specified operation scenario for the two or more configurable systems; and
  operating the two or more configurable systems in accordance with the operation parameters.

The term computer should be understood broadly. For example, it also may comprise mobile devices, electronic control units, and other processor-based data processing devices.

The computer program may, for example, be made available for electronic retrieval or stored on a computer-readable storage medium.

In another example aspect, an apparatus for controlling operation of two or more configurable systems of a motor vehicle comprises:

- an input configured to receive, via a user interface of a mobile user device, a user input specifying an operation scenario;
- a parameter retrieving circuit configured to retrieve operation parameters associated with the specified operation scenario for the two or more configurable systems; and
- an operating circuit configured to operate the two or more configurable systems in accordance with the operation parameters.

In some embodiments, a user may control multiple configurable systems of a motor vehicle using a mobile user device, e.g. a smartphone, a tablet or a wearable, by simply specifying a desired operation scenario in a user interface of the mobile user device. Examples of operation scenarios include watching video, playing a video game, relaxing, video conferencing, working, etc. Upon receipt of the desired operation scenario, associated operation parameters for the various configurable systems are retrieved. The configurable systems are then operated in accordance with these operation parameters. In this way, the user has the possibility to control multiple configurable systems with a single input in the user interface of the mobile user device. The described solution thus provides a satisfying user experience. The operation scenarios may, for example, be specified by a manufacturer of the motor vehicle, by a service provider, or by the user. Beneficially the operation scenarios or the associated operation parameters may be modified by the user. The operation parameters may be retrieved from a storage of the mobile user device. In this case, the retrieved operation parameters will be provided from the mobile user device directly to the configurable systems or to a control circuit of the motor vehicle. Alternatively, the operation parameters may be retrieved from a storage of the motor vehicle. In this case, the mobile user device for example just provides an identification of the operation scenario to a control unit of the motor vehicle.

In some embodiments, the two or more configurable systems are part of a presentation system of the motor vehicle. For example, the two or more configurable systems may include a display system, a sound system, or an ambient lighting system. While the teachings herein are generally applicable to any configurable system of a motor vehicle, adaptation of these systems is rather likely to be desired by a user. As such, use of the teachings herein is particularly useful for these configurable systems.

In some embodiments, operating the two or more configurable systems comprises bringing a display surface of the display system into a use position. For example, the display surface may be a display, a projection screen, or a roll-up display. In response to the selection of an operation scenario that requires video presentation, a display may be extended or a projection screen may come up. In addition, one or more projectors may be switched on. Alternatively, a roll-up display may be unrolled, e.g., an OLED-display (OLED: Organic Light Emitting Diode).

In some embodiments, operating the two or more configurable systems comprises adapting display parameters of the display system. For example, color settings or frame rates may be adapted to the content that will be displayed. For example, different settings may be used for movie playback, video games, display of a desktop, or video conferences. In this way, depending on the specific application optimal settings may be used.

In some embodiments, operating the two or more configurable systems comprises adapting an arrangement of information displayed by the display system. For example, to reduce distraction, the user may wish to display less information on a head-up display. Some information may instead be displayed on an infotainment system of the motor vehicle or even on the mobile device. By selecting appropriate operation scenarios directed towards the amount and position of displayed information, the arrangement of the displayed information may easily be controlled by the user.

In some embodiments, operating the two or more configurable systems comprises adapting sound parameters of the sound system. For example, cinema sound may be preferable for video playback, whereas a deep, rich bass may be used for playing games. For video conferences, a balanced sound reproduction at all frequencies may be desirable. In this way, the sound parameters of the sound system may easily be adapted to the specific application.

In some embodiments, operating the two or more configurable systems comprises changing a color or an intensity of ambient light generated by the ambient lighting system. For example, muted colors may be preferable during video playback, playing games, relaxing, or at nighttime, whereas brighter light may be preferable for working or at daytime. In this way, the ambient light may easily be adapted to the specific application.

In some embodiments, the two or more configurable systems are only operated in accordance with the operation parameters when the motor vehicle is not in a manual operating situation. For example, operations scenarios that may cause a distraction of the user may only be activated when the motor vehicle is not in operation or is in autonomous operation. In this way, a safe operation of the motor vehicle is ensured. Operation scenarios that will not cause a distraction of the user, such as relaxing or a simple rearrangement of the displayed information, may also be activated in a manual operating situation.

Beneficially, a mobile user device comprises an apparatus according to the teachings herein or is configured to perform a method according to the teachings herein for controlling operation of two or more configurable systems of a motor vehicle. For example, the mobile user device may be a smartphone, a tablet or a wearable. This has the benefit that users today are accustomed to operating all kinds of devices using applications running on their own mobile devices. For example, such an application may be used even if the user is outside of the motor vehicle.

Beneficially, a motor vehicle comprises an apparatus according to the teachings herein or is configured to perform a method according to the teachings herein for controlling operation of two or more configurable systems of the motor vehicle based on information received from a mobile user device. For example, the motor vehicle may be a car, a bus, or a commercial vehicle, e.g., a truck. More generally, the teachings herein may be used in land vehicles, rail vehicles, watercrafts, and aircrafts.

Further features of the present invention will become apparent from the following description and the appended claims in conjunction with the FIGS.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

FIG. 1 schematically illustrates a method according to embodiments for controlling operation of two or more configurable systems of a motor vehicle. For example, the two or more configurable systems may be part of a presentation system of the motor vehicle and may include a display system, a sound system, or an ambient lighting system. In a first step, a user input specifying an operation scenario is received 10 via a user interface of a mobile user device. Operation parameters associated with the specified operation scenario are then retrieved 11 for the two or more configurable systems and the two or more configurable systems are operated 12 in accordance with the operation parameters. For example, operating the two or more configurable systems may comprise bringing a display surface of a display system, such as a display, a projection screen, or a roll-up display, into a use position, adapting display parameters of the display system, or adapting an arrangement of information displayed by the display system. Likewise, operating the two or more configurable systems may comprise adapting sound parameters of a sound system or changing a color or an intensity of ambient light generated by an ambient lighting system. Beneficially, the two or more configurable systems are only operated in accordance with the operation parameters when the motor vehicle is not in a manual operating situation.

Figure 2:
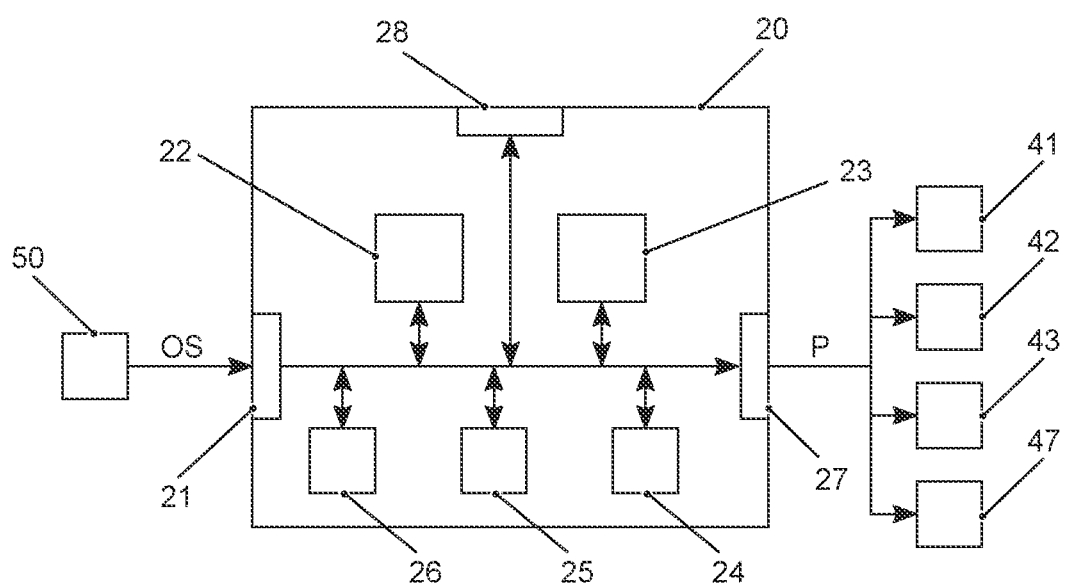
FIG. 2 schematically illustrates a first embodiment of an apparatus for controlling operation of two or more configurable systems of a motor vehicle.

FIG. 2 schematically illustrates a block diagram of a first embodiment of an apparatus 20 according to embodiments for controlling operation of two or more configurable systems 41, 42, 43 of a motor vehicle. For example, the two or more configurable systems 41, 42, 43 may be part of a presentation system of the motor vehicle and may include a display system 41, a sound system 42, or an ambient lighting system 43. The apparatus 20 has an input 21, via which an input unit 22 receives a user input via a user interface of a mobile user device 50, the user input specifying an operation scenario OS. A parameter retrieving unit 23 is configured to retrieve operation parameters P associated with the specified operation scenario OS for the two or more configurable systems 41, 42, 43. An operating unit 24 is configured to operate the two or more configurable systems 41, 42, 43 in accordance with the operation parameters P. For this purpose, the operating unit 24 may provide the operation parameters P directly to the configurable systems 41, 42, 43 or to a control unit 47 of the motor vehicle via an output 27. A local storage unit 26 is provided, e.g. for storing data during processing. The input 21 and the output 27 may likewise be combined into a single bidirectional interface. For example, operating the two or more configurable systems 41, 42, 43 may comprise bringing a display surface of a display system 41, such as a display, a projection screen, or a roll-up display, into a use position, adapting display parameters of the display system 41, or adapting an arrangement of information displayed by the display system 41. Likewise, operating the two or more configurable systems 41, 42, 43 may comprise adapting sound parameters of a sound system 42 or changing a color or an intensity of ambient light generated by an ambient lighting system 43. Beneficially, the two or more configurable systems 41, 42, 43 are only operated in accordance with the operation parameters P when the motor vehicle is not in a manual operating situation.

The input unit 22, the parameter retrieving unit 23, and the operating unit 24 may be controlled by a control unit 25. A user interface 28 may be provided for enabling a user to modify settings of the input unit 22, the parameter retrieving unit 23, the operating unit 24, or the control unit 25. The various units 22-25 may be embodied as dedicated hardware units. Of course, they may likewise be fully or partially combined into a single unit or implemented as software running on a processor, e.g. a CPU or a GPU.

Figure 3:
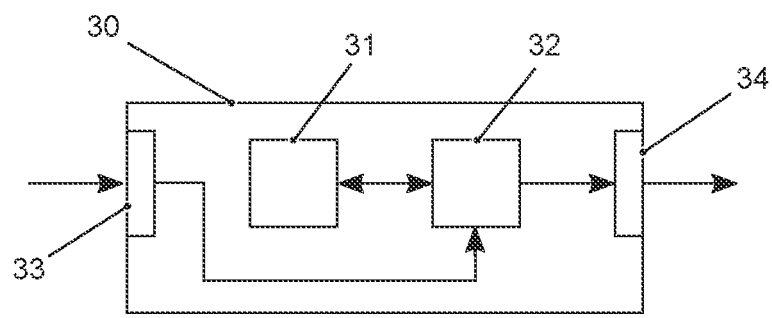
FIG. 3 schematically illustrates a second embodiment of an apparatus for controlling operation of two or more configurable systems of a motor vehicle.

A block diagram of a second embodiment of an apparatus 30 for controlling operation of two or more configurable systems of a motor vehicle is illustrated in FIG. 3. The apparatus 30 comprises a processing device (processor) 31 and a memory device 32. For example, the apparatus 30 may be a computer, a mobile device, or an electronic control circuit. The memory device 32 has stored instructions that, when executed by the processing device 31, cause the apparatus 30 to perform steps according to one of the described methods. The instructions stored in the memory device 32 thus tangibly embody a program of instructions executable by the processing device 31 to perform program steps as described herein according to the present principles. The apparatus 30 has an input 33 for receiving data. Data generated by the processing device 31 are made available via an output 34. In addition, such data may be stored in the memory device 32. The input 33 and the output 34 may be combined into a single bidirectional interface.

The processing device 31 as used herein may include one or more processing circuits, such as microprocessors, digital signal processors, or a combination thereof.

The local storage unit 26 and the memory device 32 may include volatile and/or non-volatile memory regions and storage devices such as hard disk drives, optical drives, and/or solid-state memories.

Figure 4:
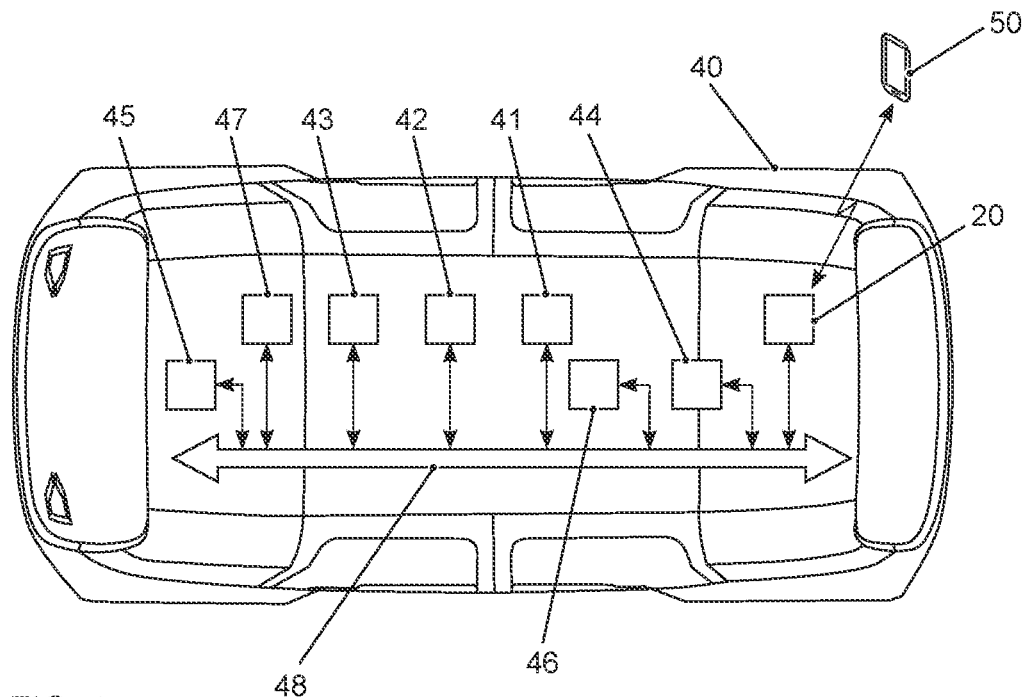
FIG. 4 shows an example motor vehicle suitable for use with the described embodiments.

FIG. 4 shows a motor vehicle 40 suitable for use with the described solution. In this example, the motor vehicle 40 is a car. The motor vehicle 40 comprises a display system 41, a sound system 42, and an ambient lighting system 43. The motor vehicle 40 further comprises a plurality of sensor units 44, e.g., a camera, a radar sensor, and an ultra-sound sensor. Of course, other types of sensor units may likewise be used, such as a laser scanner or a lidar sensor. A data transmission unit 45 is provided, e.g. for exchanging data with other motor vehicles or with a service provider. For this purpose, the data transmission unit 45 may make use of known communication technologies, such as IEEE802.11p or 3GPP C-V2X. For storing data, a local storage unit 46 is provided. The various components of the motor vehicle 40 may be controlled by a control unit 47. Data exchange between the components of the motor vehicle 40 is performed via a network 48. For controlling operation of the display system 41, the sound system 42, and the ambient lighting system 43, an apparatus 20 is provided. In this example, the apparatus 20 is included in the motor vehicle 40 and receives information from a mobile user device 50. Alternatively, the apparatus may be included in the mobile user device 50.

Figure 5:
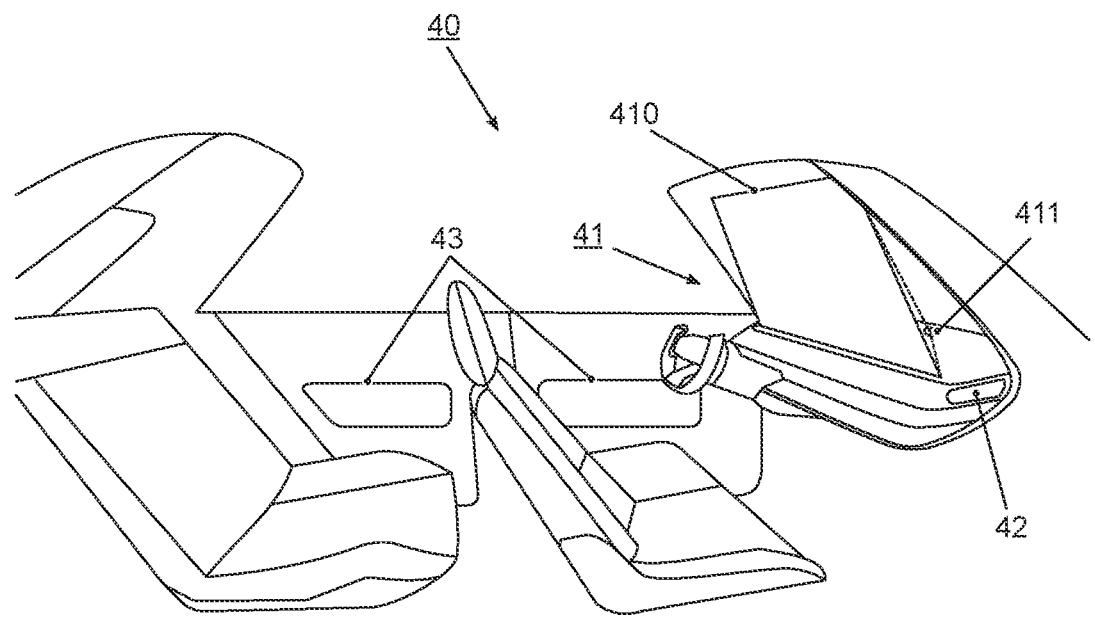
FIG. 5 shows an example interior of the motor vehicle of FIG. 4.

FIG. 5 shows an interior of the motor vehicle 40 of FIG. 4. In this example, a user has, via a mobile user device, specified the operation scenario as "watching video". In response to this operation scenario, a display surface 410 of the display system 41 is brought into a use position. In this example, the display surface 410 is a projection screen, onto which one or more projectors 411 project the desired video information. The display system 41 may further include a head-up display or an infotainment system (not shown). In addition, sound parameters of the sound system 42 are adapted, e.g., switched to cinema sound. Finally, the color and intensity of ambient light generated by the ambient lighting system 43 are matched to the operation scenario. For example, the ambient light may be dimmed and shifted to a dark red. In other operation scenarios, such as playing a video game, relaxing, video conferencing, or working, other settings may be used, e.g. bright ambient light and a different sound equalization.

Figure 6:
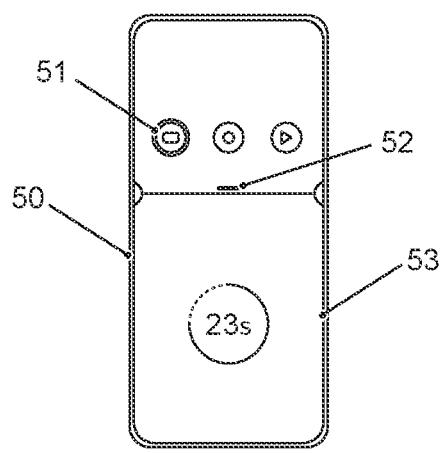
FIG. 6 shows an example of a mobile user device suitable for use with the described embodiments.

FIG. 6 shows a mobile user device 50 suitable for use with the described solution. In this example, the mobile user device 50 is a smartphone. The mobile user device 50 shows a user interface UI with a number of buttons 51 for various operation scenarios. The operation scenarios may, for example, be specified by a manufacturer of the motor vehicle, by a service provider, or by the user. As can be seen, buttons 51 for watching video, playing a video game, and relaxing may be activated. Further buttons 51 may be available by scrolling the buttons 51 to the left or to the right, as indicated by a scroll bar 52. Upon activation of a specific button 51, the corresponding operation scenario is selected and the operation parameters of two or more configurable systems of the motor vehicle are set accordingly. An information window 53 of the user interface UI may be used to inform the user about the progress of setting the operation parameters.

Figure 7:
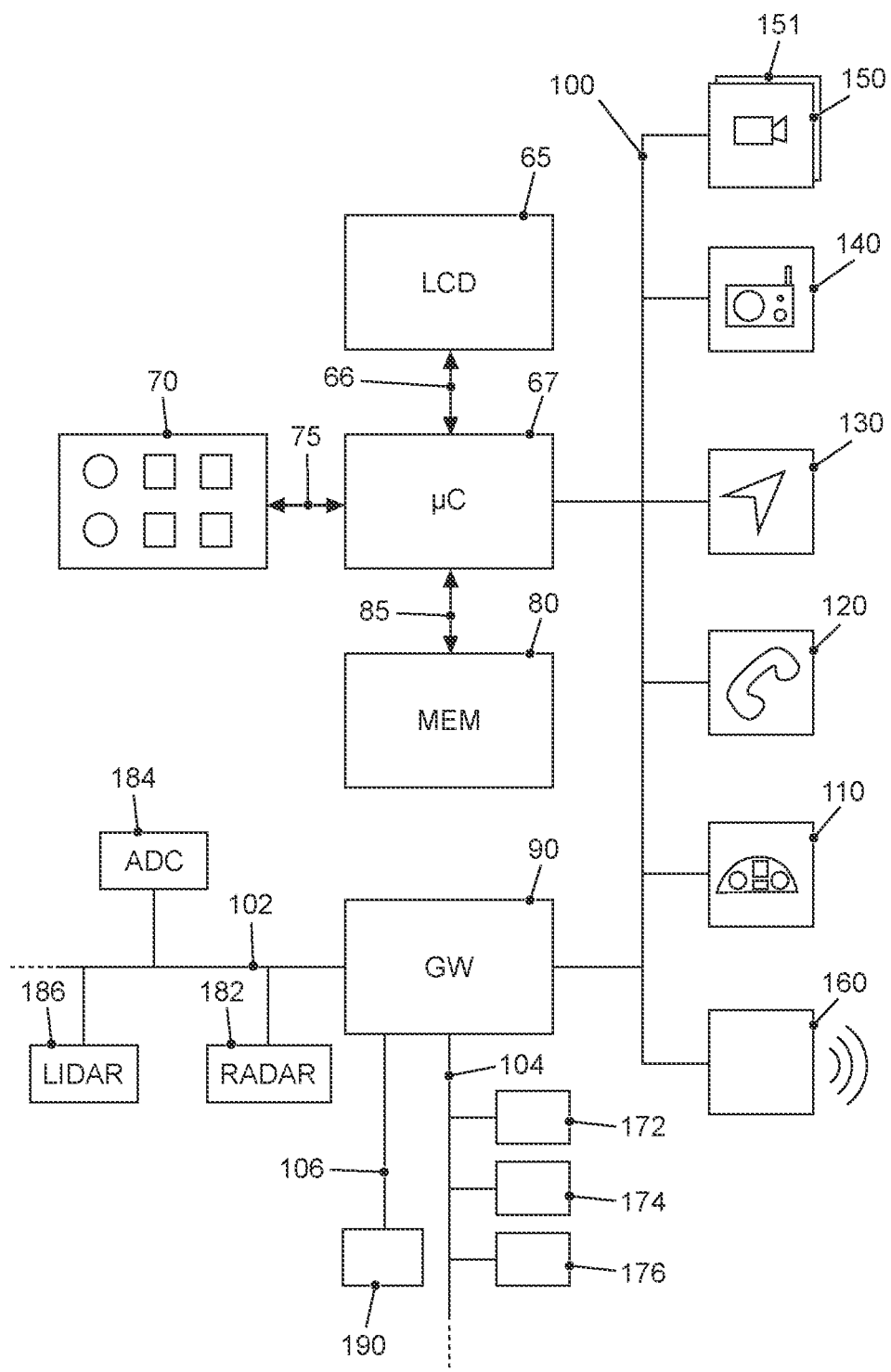
FIG. 7 shows an example block diagram of an electronics system of a motor vehicle.

FIG. 7 schematically shows a block diagram of a board electronics system of a motor vehicle. Part of the board electronics system is an infotainment system, which comprises a touch-sensitive display 65, a computing device (computer) 67, an input 70, and a memory device 80. The display 65 is connected to the computing device 67 via a data line 66 and includes both a display area for displaying variable graphical information and an operator interface (touch-sensitive layer) arranged above the display area for inputting commands by a user. The input 70 is connected to the computing device 67 via a data line 75.

The memory device 80 is connected to the computing device 67 via a data line 85. In the memory device 80, a pictogram directory and/or symbol directory is deposited with pictograms and/or symbols for possible overlays of additional information.

The other parts of the infotainment system, such as a camera 150, radio 140, navigation device 130, telephone 120 and instrument cluster 110 are connected via a data bus 100 with the computing device 60. As data bus 100, the high-speed variant of the CAN (Controller Area Network) bus according to ISO standard 11898-2 may be used. Alternatively, an Ethernet-based bus system such as IEEE 802.03cg may be used. Bus systems implementing the data transmission via optical fibers are also usable. Examples are the MOST Bus (Media Oriented System Transport) or the D2B Bus (Domestic Digital Bus). For inbound and outbound wireless communication, the vehicle is equipped with an on-board connectivity circuit 160. It may be used for mobile communication, e.g. mobile communication according to the 5G standard.

Reference numeral 172 denotes an engine control circuit. Reference numeral 174 denotes an ESC (electronic stability control) circuit, whereas reference numeral 176 denotes a transmission control circuit. The networking of such control circuits, all of which are allocated to the category of the drive train, typically occurs with a CAN bus 104. Since various sensors are installed in the motor vehicle and these are no longer only connected to individual control circuits, such sensor data are also distributed via the bus system 104 to the individual control circuits.

Modern vehicles may comprise additional components, such as further sensors for scanning the surroundings, like a LIDAR sensor 186 or a RADAR sensor 182 and additional video cameras 151, e.g., a front camera, a rear camera or side cameras. Such sensors are increasingly used in vehicles for observation of the environment. Further control devices, such as an ADC (automatic driving control) circuit 184, etc., may be provided in the vehicle. The RADAR and LIDAR sensors 182, 186 may have a scanning range of up to 250 m, whereas the cameras 150, 151 may cover a range from 30 m to 120 m. The components 182 to 186 are connected to another communication bus 102, e.g., an Ethernet-Bus due to its higher bandwidth for data transport. One Ethernet-bus adapted to the special needs of car communication is standardized in the IEEE 802.1Q specification. Moreover, a lot of information about the environment may be received via V2V (Vehicle-to-Vehicle) communication from other vehicles. Particularly for those vehicles that are not in line of sight to the observing vehicle, it is very beneficial to receive the information about their position and motion via V2V communication.

Reference numeral 190 denotes an on-board diagnosis interface, which is connected to another communication bus 106.

For the purpose of transmitting the vehicle-relevant sensor data via the an on-board connectivity circuit 160 to another vehicle or to a control center computer, a gateway 90 is provided. This gateway 90 is connected to the different bus systems 100, 102, 104 and 106. The gateway 90 is adapted to convert the data it receives via one bus to the transmission format of another bus so that it may be distributed using the packets specified for the respective other bus. For forwarding this data to the outside, i.e., to another vehicle or to the control central computer, the an on-board connectivity circuit 160 is equipped with a communication interface to receive these data packets and, in turn, to convert them into the transmission format of the appropriate mobile radio standard.

LIST OF REFERENCE NUMERALS

10 Receive user input specifying operation scenario
11 Retrieve operation parameters associated with operation scenario
12 Operate configurable systems in accordance with operation parameters
20 Apparatus
21 Input
22 Input unit
23 Parameter retrieving unit
24 Operating unit
25 Control unit
26 Local storage unit
27 Output
28 User interface
30 Apparatus
31 Processing device
32 Memory device
33 Input
34 Output
40 Motor vehicle
41 Display system
42 Sound system
43 Ambient lighting system
44 Sensor units
45 Data transmission unit
46 Local storage unit
47 Control unit
48 Network
50 Mobile user device
51 Button
52 Scroll bar
53 Information window
65 Display Unit
66 Data line to display unit
67 Computing device
70 Input unit
75 Data line to input unit
80 Memory unit
85 Data line to memory unit
90 Gateway
100 First data bus
102 Second data bus
104 Third data bus
106 Fourth data bus
110 Instrument cluster
120 Telephone
130 Navigation device
140 Radio
150 Camera
151 Further cameras
160 On-board connectivity module
172 Engine control unit
174 Electronic stability control unit
176 Transmission control unit
182 RADAR sensor
184 Automatic driving control unit
186 LIDAR sensor
190 On-board diagnosis interface
410 Display surface
411 Projector
OS Operation scenario
P Operation parameters
UI User interface The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for controlling operation of two or more configurable systems of a motor vehicle, the method comprising:
receiving, via a user interface of a mobile user device, a single user input specifying an operation scenario for adapting an interior of the motor vehicle;
retrieving operation parameters associated with the specified operation scenario for the two or more configurable systems; and
operating the two or more configurable systems in accordance with the operation parameters based on the single user input.

2. The method of claim 1, wherein the two or more configurable systems are part of a presentation system of the motor vehicle.

3. The method of claim 1, wherein the two or more configurable systems include one or more of a display system, a sound system, or an ambient lighting system.

4. The method of claim 3, wherein operating the two or more configurable systems comprises bringing a display surface of the display system into a use position.

5. The method of claim 4, wherein the display surface is a display, a projection screen, or a roll-up display.

6. The method of claim 3, wherein operating the two or more configurable systems comprises adapting display parameters of the display system.

7. The method of claim 3, wherein operating the two or more configurable systems comprises adapting an arrangement of information displayed by the display system.

8. The method of claim 3, wherein operating the two or more configurable systems comprises adapting sound parameters of the sound system.

9. The method of claim 3, wherein operating the two or more configurable systems comprises changing a color or an intensity of ambient light generated by the ambient lighting system.

10. The method of claim 1, wherein the mobile user device is a smartphone, a tablet or a wearable.

11. The method of claim 1, wherein the two or more configurable systems are only operated in accordance with the operation parameters when the motor vehicle is not in a manual operating situation.

12. A non-transitory medium with instructions, which, when executed by a computer, cause the computer to:
receive single user input specifying an operation scenario for adapting an interior of the motor vehicle;
retrieve operation parameters associated with the specified operation scenario for the two or more configurable systems; and
operate the two or more configurable systems in accordance with the operation parameters based on the single user input.

13. An apparatus for controlling operation of two or more configurable systems of a motor vehicle, the apparatus comprising:
an input, configured to receive, via a user interface of a mobile user device, a single user input specifying an operation scenario for adapting an interior of the motor vehicle;
a parameter retrieving circuit, configured to retrieve operation parameters associated with the specified operation scenario for the two or more configurable systems; and
an operating circuit, configured to operate the two or more configurable systems in accordance with the operation parameters based on the single user input.

14. A mobile user device, wherein the mobile user device comprises the apparatus of claim 13.

15. A motor vehicle equipped with two or more configurable systems, wherein the motor vehicle comprises the apparatus of claim 13.

16. The method of claim 2, wherein the two or more configurable systems include one or more of a display system, a sound system, or an ambient lighting system.

17. The method of claim 4, wherein operating the two or more configurable systems comprises adapting display parameters of the display system.

18. The method of claim 5, wherein operating the two or more configurable systems comprises adapting display parameters of the display system.

19. The method of claim 4, wherein operating the two or more configurable systems comprises adapting an arrangement of information displayed by the display system.

20. The method of claim 5, wherein operating the two or more configurable systems comprises adapting an arrangement of information displayed by the display system.

* * * * *